(12) United States Patent
Zhu et al.

(10) Patent No.: US 10,367,236 B2
(45) Date of Patent: Jul. 30, 2019

(54) ANODE, CELL, AND METHOD OF STABILIZING AN ANODE FOR USE IN A LITHIUM ION ELECTROCHEMICAL CELL

(71) Applicant: OneD Material LLC, Palo Alto, CA (US)

(72) Inventors: Yimin Zhu, Fremont, CA (US); Chunsheng Du, Fremont, CA (US)

(73) Assignee: OneD Material LLC, Palo Alto, CA (US)

( * ) Notice: Subject to any disclaimer, the term of this patent is extended or adjusted under 35 U.S.C. 154(b) by 171 days.

(21) Appl. No.: 15/121,215

(22) PCT Filed: Feb. 24, 2015

(86) PCT No.: PCT/US2015/017307
§ 371 (c)(1),
(2) Date: Aug. 24, 2016

(87) PCT Pub. No.: WO2015/127442
PCT Pub. Date: Aug. 27, 2015

(65) Prior Publication Data
US 2017/0012325 A1 Jan. 12, 2017

Related U.S. Application Data

(60) Provisional application No. 61/943,759, filed on Feb. 24, 2014.

(51) Int. Cl.
*H01M 10/48* (2006.01)
*H01M 4/36* (2006.01)
*H01M 4/38* (2006.01)
*H01M 4/485* (2010.01)
*H01M 4/58* (2010.01)
*H01M 4/587* (2010.01)
*H01M 4/62* (2006.01)
*H01M 4/66* (2006.01)
*H01M 4/75* (2006.01)
*H01M 10/0525* (2010.01)

(52) U.S. Cl.
CPC ........... *H01M 10/48* (2013.01); *H01M 4/366* (2013.01); *H01M 4/386* (2013.01); *H01M 4/485* (2013.01); *H01M 4/587* (2013.01); *H01M 4/5825* (2013.01); *H01M 4/625* (2013.01); *H01M 4/661* (2013.01); *H01M 4/75* (2013.01); *H01M 10/0525* (2013.01)

(58) Field of Classification Search
CPC ....... H01M 10/48; H01M 4/366; H01M 4/386
See application file for complete search history.

(56) References Cited

U.S. PATENT DOCUMENTS

| | | | |
|---|---|---|---|
| 2011/0250478 A1 | 10/2011 | Timmons et al. | |
| 2013/0300883 A1 | 11/2013 | Mistretta et al. | |
| 2013/0314051 A1* | 11/2013 | Takezawa | H01M 10/0525 320/134 |

OTHER PUBLICATIONS

International Search Report and Written Opinion in International Application No. PCT/US2015/017307, dated Apr. 28, 2015.

(Continued)

*Primary Examiner* — Olatunji A Godo
(74) *Attorney, Agent, or Firm* — Nixon Peabody LLP

(57) ABSTRACT

A battery comprises an anode, a cathode, a first reference electrode, and a second reference electrode. The battery also include an electrolyte between each of the anode, cathode, first reference electrode, and second reference electrode.

13 Claims, 13 Drawing Sheets

Three Electrode Pouch Full Cell with safety control function

(56) References Cited

OTHER PUBLICATIONS

International Preliminary Report on Patentability in International Application No. PCT/US2015/017307, dated Sep. 9, 2016.
Chan, C. K., et al., "High-performance lithium battery anodes using silicon nanowires", nature nanotechnology, vol. 3, Jan. 2008, pp. 31-35; 2008 Nature Publishing Group, Published online: Dec. 16, 2007.
Holzapfel, M., et al., "A new type of nano-sized silicon/carbon composite electrode for reversible lithium insertion", Chem. Commun., Jan. 26, 2005; pp. 1566-1568; The Royal Society of Chemistry 2005.
Kolasinski, K. W., "Catalytic growth of nanowires: Vapor-liquid-solid, vapor-solid-solid, solution-liquid-solid and solid-liquid-solid-growth", Current Opinion in Solid State and Materials Science, vol. 10, Issues 3-4, Jun.-Aug. 2006, pp. 182-191; Elsevier.
Li, H., et al., "The crystal structural evolution of nano-Si anode caused by lithium insertion and extraction at room temperature", Solid State Ionics, vol. 135, Issues 1-4, Nov. 2000, pp. 181-191; NH Elsevier.
Liu, Y., et al., "Novel negative electrode materials with high capacity density for further rechargeable lithium ion batteries", Res. Rep. Fac. Eng. Mie Univ., vol. 29, Oct. 20, 2004; pp. 65-72.
Yang, J., et al., "Si/C Composites for High Capacity Lithium Storage Materials", Electrochemical and Solid-State Letters, vol. 6, Issue 8, Aug. 1, 2003; pp. A154-A156.
Zuo, P., et al.,Electrochemical stability of silicon/carbon composite anode for lithium ion batteries, Electrochimica Acta, vol. 52, Issue 15, Apr. 20, 2007; pp. 4878-4883.

\* cited by examiner

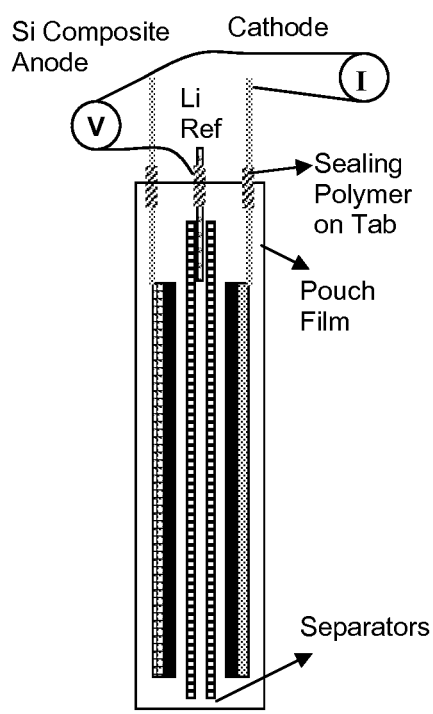
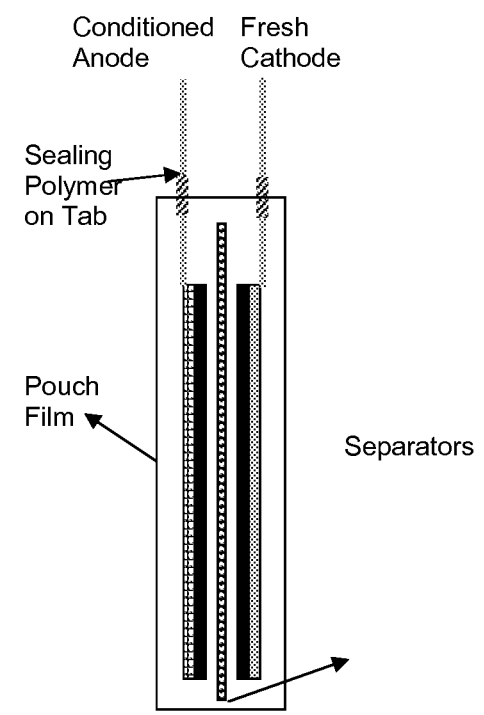
FIG. 1A  
Anode pre-conditioning pouch cell
FIG. 1B  
Rebuild Pouch Full Cell

ANODE, CELL, AND METHOD OF STABILIZING AN ANODE FOR USE IN A LITHIUM ION ELECTROCHEMICAL CELL

RELATED APPLICATIONS

This patent application is a United States National Stage Application filed under 35 U.S.C. § 371 of International Application No. PCT/US2015/017307, entitled "ANODE, CELL, AND METHOD OF STABILIZING AN ANODE FOR USE IN A LITHIUM ION ELECTROCHEMICAL CELL" which was filed on Feb. 24, 2015 which claims the benefit of, and priority to, U.S. Provisional Patent Application Ser. No. 61/943,759 filed on Feb. 24, 2014, the disclosure of which is hereby incorporated by reference in its entirety.

FIELD

The invention relates to lithium ion electrochemical cells (e.g., batteries).

BACKGROUND

Tremendous efforts have been made to overcome anode material problems by decreasing the particle size, using silicon-based thin films, silicon-nanotubes, porous silicon and silicon-metal alloys, dispersing silicon into an inactive/active matrix, and coating with carbon as well as using different electrolyte systems and binder systems. In these approaches a variety of composites of active and inactive materials have been widely exploited in which the inactive component plays a structural buffering role to minimize the mechanical stress induced by huge volume change of active silicon, thus preventing the deterioration of the electrode integrity.

One reference electrode cannot maintain its sensing potential, e.g., the potential will drift over time which may cause battery operation to spiral out of control. However, all batteries need to be operated as long as possible. It can be several hundred thousand cycles for grid energy storage and transportation. In addition, metallic lithium-related reference electrodes cannot be applied in a dry room battery manufacturing condition.

SUMMARY

A battery comprises an anode, a cathode, a first reference electrode, and a second reference electrode. The battery also include an electrolyte between each of the anode, cathode, first reference electrode, and second reference electrode.

Wherein the anode comprises a graphite powder.

Wherein the anode comprises carbon with silicon deposited on the carbon in the form of nanowires.

Wherein the anode comprises carbon with silicon deposited on the carbon in the form of a thin film.

Wherein the battery further comprises a separator between the anode and cathode.

Wherein the first reference electrode comprises lithium titanium oxide (LTO).

Wherein the second reference electrode comprises lithium iron phosphate (LFP).

Wherein at least one of the first and second reference electrodes are disposed on a copper, nickel, or aluminum wire.

Wherein the wire includes a spotted coating comprising lithium.

Wherein the first reference electrode includes a different material than the second reference electrode.

A method includes providing an anode and cathode in an electrochemical cell, the electrochemical cell comprising an electrolyte. The method also includes providing a first reference electrode and a second reference electrode. The method also includes controlling a potential within the cell using at least the first reference electrode and the second reference electrode.

Wherein the method further includes diagnosing a health of the battery based on a measured potential distribution for either the anode or the cathode.

Wherein controlling the potential includes maintaining a natural potential difference between the anode and cathode based on the material used for the anode and the cathode.

Wherein the controlling includes controlling a potential of the anode, independent of a potential of the cathode.

Wherein the controlling comprises controlling a potential of the cathode, independent of a potential of the anode.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention. Embodiments of the invention are described, by way of example only, with reference to the accompanying drawings, in which:

FIGS. 1A and 1B illustrate two pouch cell configurations, according to embodiments.

Figure 2:
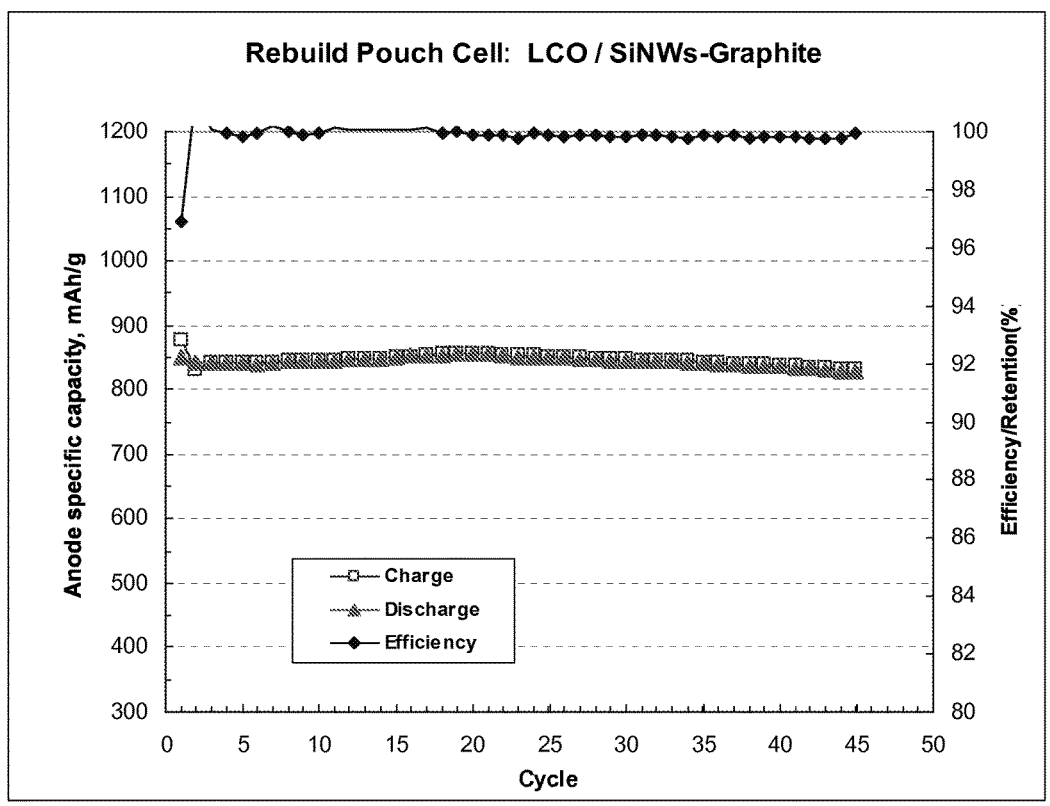
FIG. 2 illustrates charging and discharging of a pouch cell, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

I. Silicon Composite Anode Conditioning and Safe Lithium Ion Cell Design

The inventors have developed Si—Li or Si/C—Li negative electrodes that utilizes the high capacity of Si in Li ion batteries. The silicon can be in the form of Si nanowires, Si nanopowders, Si thin films that directly grow or deposit on carbon powders or graphite powders.

A desired electrolyte solution has been developed and optimized to form appropriate solid electrolyte interface (SEI) layer on silicon and carbon for the negative electrode to stabilize the electrodes. About 1000 cycles of performance can be achieved at 80% capacity retention for batteries using silicon nanowires grown on graphite powders as the anode, and typical cathode materials such as nickel cobalt aluminum (NCA) can also be used.

The inventors have identified that the measured capacity fades faster in the first 50 cycles, which is related to silicon-graphite crack growth at the particle surface and thin solid-electrolyte interphase (SEI) formation and re-formation during the crack growth. This can be reflected by the pouch cell thickness increase of 11% in the first 50 cycles. In the first 50~80 cycles the SEI formation is limited by diffusion through the existing SEI and hence the SEI becomes thicker so only less than about 2% of the overall pouch cell thickness increases in the first 50~80 cycles. Then the SEI is stabilized after around 80 cycles so a very stable cell performance has been realized with almost no further pouch cell swelling.

The first 50 or 80 cycles can be characterized as an electrode/cell conditioning step to design a cell to finish the conditioning step as a final manufacturing step, or even accelerate the cell conditioning step in the cell by using a designer cell. Eventually, the silicon composite material treatment may allow the conditioning step to be completed in only a few cycles.

Three electrode pouch cells have been designed so that one can condition the anode in a half cell cycling mode first without destroying cathode material structure and conditioning under anode potential control.

FIGS. 1A and 1B illustrate two pouch cell configurations, including: anode pre-conditioning three-electrode pouch cell with anode (Si composite), double separators, Li metal micro reference electrode and cathode made from materials such as lithium cobalt oxide (LCO), nickel cobalt aluminum (NCA), nickel cobalt manganese oxide (NCM) or lithium iron phosphate (LFP), as shown in FIG. 1A. A rebuilt pouch full cell using the conditioned anode and fresh cathode (LCO, NCA, NCM or LFP) is shown in FIG. 1B.

In anode pre-conditioning of the pouch cell, the anode potential is controlled by Li metal reference micro-electrode and hence the Li plating can be avoided. The anode is lithiated or delithiated by passing current between the anode and cathode. The cathode contains an excess capacity over the anode capacity by about 10~30% so that the anode capacity can be fully utilized and conditioned. After the anode reaches its stabilized state in approximately 50~80 cycles, for example, the anode is delithiated and then the pouch cell is disassembled so that the cycled cathode, Li reference electrode and the separator on the cathode side can be removed. Using a fresh cathode, the conditioned anode and the separator on the anode side can be rebuilt to form a regular pouch full cell. The rebuilt pouch cell shows a very stable performance as shown in FIG. 2. Its coulombic efficiency is almost 100% even though its anode specific capacity is 850 mAh/g. FIG. 2 illustrates rebuilt pouch full cell cycling performance at +0.3 C/−0.5 C; its electrode loading is ca. 4 mAh/cm2 for one side electrode layer.

Figure 3:
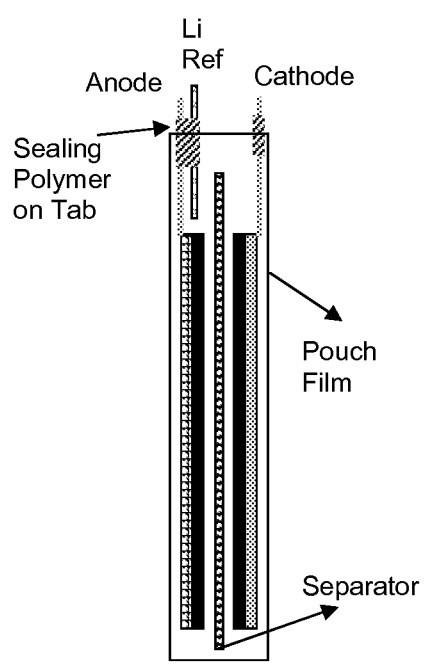
FIG. 3 illustrates a three electrode pouch full cell configuration, according to an embodiment.

FIG. 3 illustrates a three electrode pouch full cell configuration. A three electrode full cell (e.g., pouch cell), like the one illustrated in FIG. 3, can provide much longer cycle life and better safety feature. A cathode over anode capacity ratio can be about 1 to 1.3. A Li metal micro-reference electrode can be placed aside the anode or into a slot in the anode electrodes. The reference electrode can have a regular tab isolated by conformal polymer (e.g., polyethylene or electrolyte solution resistant-tape) and the polymer can be sealed on the tab. However, a key is to form a micro-Li metal tip at one end of the reference electrode (in situ in the full cell or pre-formed during cell fabrication). Afterwards, one can determine the optimal ratio of cathode over anode capacity during anode conditioning and its following electrode capacity matching for the rebuilt cell and fabricate a three electrode pouch cell with well-matched cathode and anode. An electronic circuit can be designed to control the anode conditioning in an anode potential of between about 0.01 to 700 mV instead of typical full cell formation in 3 to 4.2V for a LCO/Si composite anode full cell. After the anode reaches its stabilized state (well-conditioned) the pouch cell is switched to a regular full cell mode that can be charged and discharged in approximately 3 to 4.2V. Since the micro reference electrode is integrated in the full cell battery it can be used to monitor the anode potential and cathode potential to avoid Li-plating on the anode at <0V vs. Li (e.g.) and over-charging of the cathode at >4.5V vs. Li (e.g.). This electrode potential indication allows the BMS to take action instantly without waiting until observing whether cell temperature is increasing or cell pressure is too high. Therefore the Li ion battery can be a safe device for its intended battery application. At the same time, the cycle life can be dramatically improved by controlling the anode potential in approximately 0.01 and 0.6V and the cathode potential in 3 and 4.3V without risking damage to the device.

Present battery management systems (BMS's) current-voltage (I-V) characteristic can be fully programmable. A practical charging or discharging protocol can be designed on the basis of anode potential profile and cathode potential profile for all chemistries.

When the battery voltage reaches approximately 4.1 V, for example, the typical charger switches to a constant voltage phase to avoid the risk of overcharging and manages the transition from constant current to constant voltage smoothly to ensure maximum capacity is reached without risking damage to the battery. However, the cell voltage control does not reflect the anode and cathode potentials under controlled individually, in particular, Si composite anode and composite cathode have multi-phases involved during charge and discharge. It becomes critical to set up a control of the anode potential or cathode potential during full cell charging or discharging so that the cycle life can be prolonged.

Figure 4:
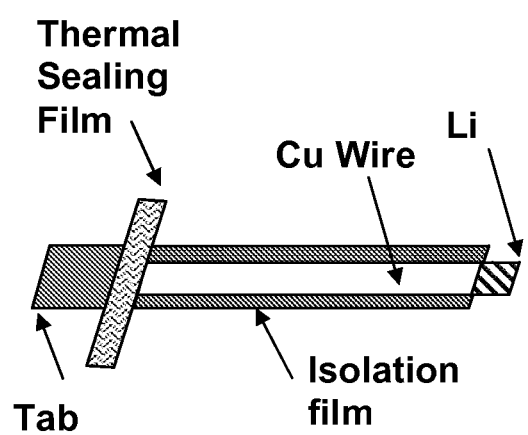
FIG. 4 illustrates a Li micro-reference electrode design, according to an embodiment.

FIG. 4 illustrates a Li micro-reference electrode design in a full cell. A lithium metal reference electrode can comprise be a piece of lithium foil, or be constructed by attaching a piece of clean metallic lithium onto a copper wire, a copper mesh or Nickel tab. When such lithium metal reference electrodes are introduced inside batteries, due to their relatively large size, the working circumstances inside the batteries are influenced, e.g. by locally disturbing the ionic pathway and shielding the electric field between the two battery electrodes. As a result, what is being measured with the reference electrodes deviates from the real working environment inside the batteries.

Figure 5:
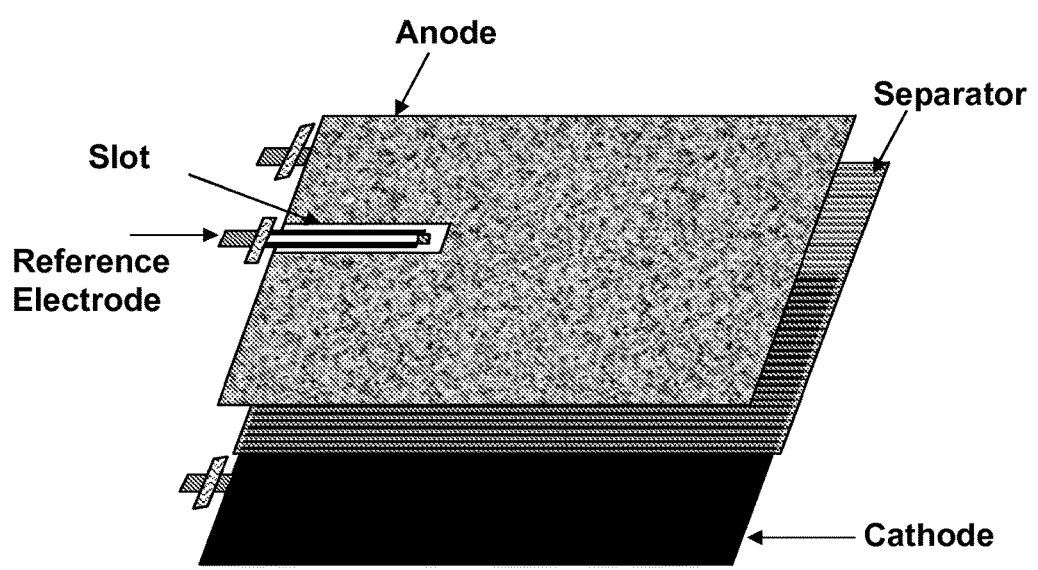
FIG. 5 illustrates a three electrode cell design using a micro-reference electrode, according to an embodiment.

A micro-reference electrode can be placed to a desired location inside of cells or even in a slot made within the electrodes, as shown in FIG. 5. It can also be made by electrochemically depositing either metallic lithium or lithium alloys onto nickel or copper wires with diameters in the micrometer range so that there is no negative impact on the cell performance, but a well-controlled anode or cathode potential that benefits the cycle life. The reference electrode framework (no Li involved) and cell fabrication can be done in a typical dry room condition, and then Li can be deposited in situ on the exposed tip of reference electrode in the cell.

Such a reference electrode has some unique features:
Minimizes the geometric disturbance to the battery performance and allows in situ measurements.
It is practical to fabricate the cells with a micro-reference electrode in a dry room environment.
This reference electrode can be easily revived by re-depositing metallic lithium onto it if the potential of the reference electrode starts to degrade after long-term cell cycling.
It only needs a trace amount of Li as the reference electrode tip has micrometer size.

The copper wires of 50 μm in diameter are used, for example, which matches the thickness of a Si composite anode layer. The Cu wire is covered with an insulation film (e.g., polyethylene) to prevent copper from being exposed to the electrolyte. Only the Li tip is exposed to the electrolyte. Thus any possible mixed potential along the wire during electrochemical operation is avoided, as shown in FIG. 4.

Figure 6:
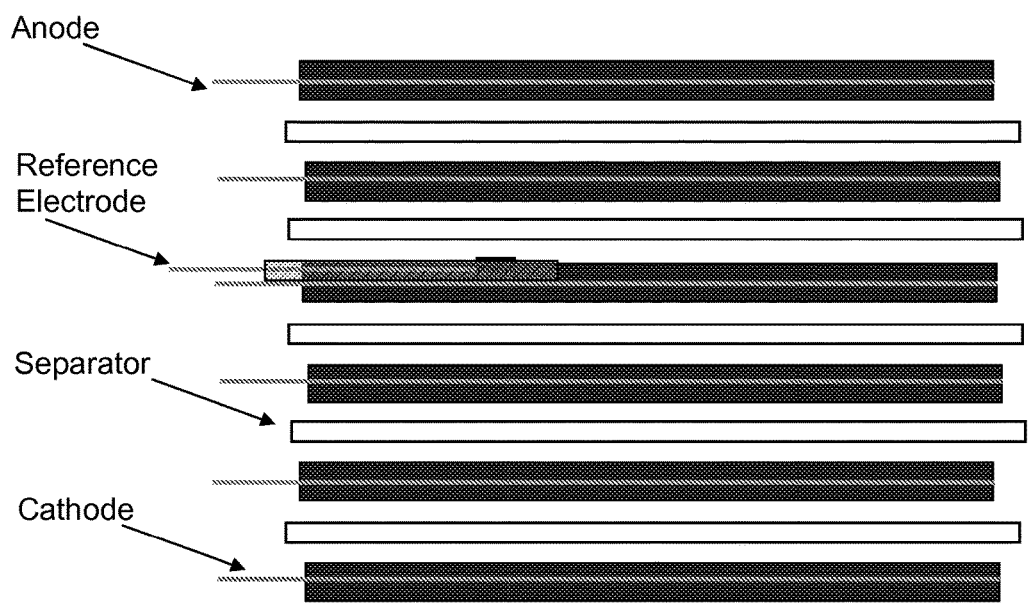
FIG. 6 illustrates a multi-layer cell assembly with a micro-reference electrode, according to an embodiment.

To make a wound jellyroll or multi-layer electrode assembly, the micro-reference electrode can be placed inside of them, as illustrated in FIG. 6, which is a multi-layer cell assembly with a micro-reference electrode.

II. Novel Silicon Composite Anode with Anti-Moisture Passivated Surface

Figure 7:
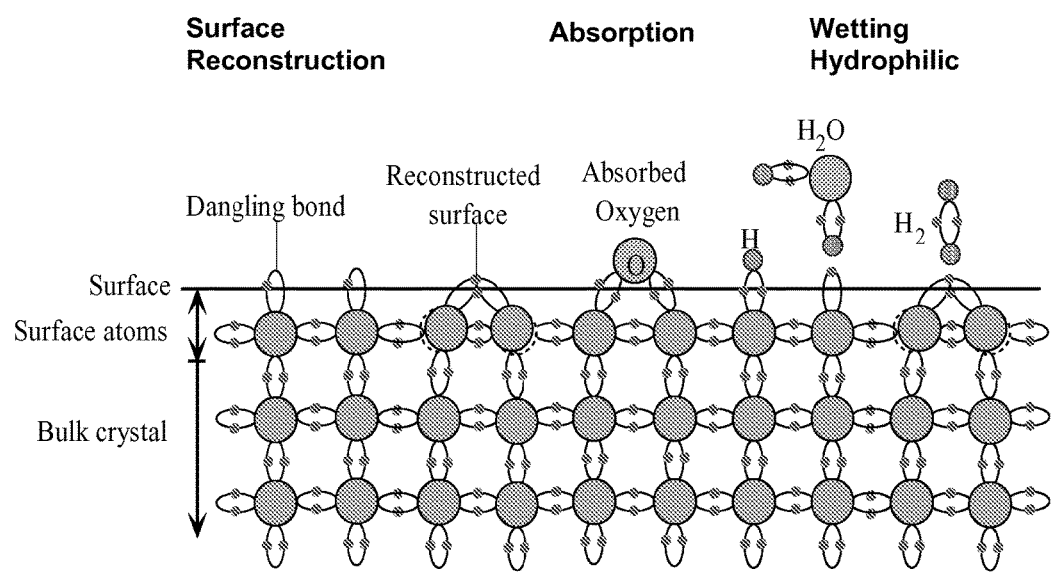
FIG. 7 illustrates examples of surface absorption, according to an embodiment.

The inventors have found that the moisture content in fuel cell electrodes and lithium ion battery electrodes has significant impact on the cell performance and cycle life, in particular, for silicon (Si) composite anodes. Si nanowires, for example, may adsorb more moisture than graphite due to not only its high surface area but also its hydrophilic surface properties as illustrated in FIG. 7. For Si particles, one can assume that the surface regions are approximately 2 atomic layers or roughly 5 Angstrom in depth. Another reason that surface properties are more important for nanomaterials is that most of atoms are at the surface, such as there are approximately ca. 27% atoms at the surface for 10 nm particles, as shown in Table 1 below.

TABLE 1

| Particle size | 1 mm | 10 nm | 2 nm |
|---|---|---|---|
| % Atoms in surface | 0.3% | 27.1% | 87.5% |

Therefore, controlling the Si composite anode moisture content becomes more critical. The inventors have discovered controlling the electrode moisture by drying the electrode in a vacuum oven in an Ar-filled glove box with about 0.1 ppm $H_2O$, which has showed significant improvement in cell performance. However, the cell manufactures can always use dry rooms for cell fabrication and manufacturing, which may contain 1~2% moisture. The surface hydrophobicity/passivation modification of nanomaterials may be a practical approach to minimize moisture content in the electrode, e.g. Si composite anode.

To systematically manage the Si-graphite composite surface property, the surface chemisorption and physisorption should be understood, as well as how to modify the surface accordingly, as summarized in Table 2 below:

TABLE 2

|  | Chemisorption | Physisorption |
|---|---|---|
| Temperature Range (SEI control) | Virtually unlimited (but a given molecule may effectively adsorb only over a small range) | Near or below the condensation point of the gas (e.g. $CO_2$ < 200 K) |
| Adsorption Enthalpy (hydrophobicity control) | Wide range (related to the chemical bond strength) - typically 40-800 kJ mol−1 | Related to factors like molecular mass and polarity but typically 5-40 kJ mol−1 (i.e. ~heat of liquefaction) |
| Crystallographic Specificity (selective SEI) | Marked variation between crystal planes | Virtually independent of surface atomic geometry |
| Nature of Adsorption (modification stability) | Often dissociative May be irreversible | Non-dissociative Reversible |
| Saturation Uptake (minimize weight impact) | Limited to one monolayer | Multilayer uptake possible |
| Kinetics of Adsorption (modification control) | Very variable - often an activated process | Fast - since it is a non-activated process |

Chemisorption typically refers to a chemical bond, involving substantial rearrangement of electron density, that is formed between the adsorbate and substrate. The nature of this bond may lie anywhere between the extremes of virtually complete ionic or complete covalent character.

The adsorption of molecules on to a surface is a necessary prerequisite to any surface mediated chemical process, including side reactions. Surface reconfiguration will impact about 2-3 atomic layers in depth (about 6-8 Å). In general, atoms in those regions are different than their cousins in bulk and therefore included at the surface.

At the surface of a hypothetical two dimensional crystal, the atoms cannot fulfill their bonding requirements and therefore have broken or dangling bonds. Some of the surface atoms bond with each other so the surface becomes reconstructed. The surface can have physisorbed and chemisorbed atoms.

As an example, the inventors have developed a fluorinated surface to make Si-graphite composite surface more hydrophobic and minimize the moisture in the electrode.

Industrial silane suppliers offer a wide range of polar and non-polar silanes that may be used to modify the surface of substrates such as glass, silica, alumina, silicon and transition metals. The surface may be treated to decrease wettability or increase adhesion of the polymer to silicon or metals. Such treatment may also allow differential polar or hydrophobic interactions. The hydrophobic class represents alkyl functional alkoxy or chlorosilanes from C2-C22 chain length. They find use in decreasing the wettability of treated surfaces, as releasing agents and for increasing the hydrophobic interactions of treated sorbents with diluents in a mobile phase. The reactive class consists of alkoxy or chloro functional silanes with an additional chemically labile group such as epoxy, acryl, vinyl or mercapto. This labile group covalently bonds to active sites on elastomers or biopolymers while the functionalized silane bonds to the substrate, thus promoting adhesion. Polar reactive materials likewise are alkoxy or chloroysilyl functional but chemically labile at a non-silyl functionality which has the added ability to hydrogen bond or form ionic salts with polar diluents in a mobile phase. Sorbents such as silica or alumina when pretreated with these polar reactive materials may show differential hydrogen or ionic interactions with two or more polar diluents. Varying the pH to optimize differential polar or hydrophobic interactions with the treated sorbent often results in an antimoisture surface. Both reactive and polar reactive classes may have extensive applications in promoting adhesion and minimizing moisture impact for the Lithium ion battery electrodes.

Table 3 includes tabulated representative samples, grouped by class. The trifunctional at silicon examples of each functionality are shown. Where a surface monolayer is required many mono chloro or alkoxysilyl examples are also available. Searching online catalogs under the nonsilyl functionality will reveal additional examples.

For example, when one uses vapor of Tridecafluoro-1,1, 2,2-tetrahydrooctyl)-1-trichlorosilane (United Chemical Technologies, Inc) to treat the Si nanowire-graphite composite powder surface (SiNANOde) for forming self-assembled monolayers (SAMs), the SiNANOde surface became hydrophobic and less sensitive to moisture during the assembling of the electrode in the cell.

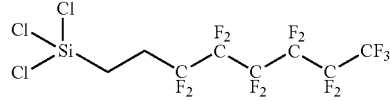

"the $R_f$——Cl silane"

TABLE 3

| Class | Functionality | Cat# | Chemical Name |
|---|---|---|---|
| Hydrophobic | C2 | E6350 | Ethyltrichlorosilane |
| Hydrophobic | C2 | E6380 | Ethyltriethoxysilane |
| Hydrophobic | C3 | P0800 | n-Propyltrichlorosilane |
| Hydrophobic | C3 | P0810 | n-Propyltrimethoxyslane |
| Hydrophobic | C4 | B2850 | n-Butyltrichlorosilane |
| Hydrophobic | C4 | B2856 | n-Butyltrimethoxysilane |
| Hydrophobic | C6 | H7332 | n-Hexyltrichlorosilane |
| Hydrophobic | C6 | H7334 | n-Hexyltrimethoxysilane |
| Hydrophobic | C8 | O9830 | n-Octyltrichlorosilane |
| Hydrophobic | C8 | O9835 | n-Octyltriethoxysilane |
| Hydrophobic | C10 | D3795 | n-Decyltrichlorosilane |
| Hydrophobic | C12 | D6220 | n-Dodecyltrichlorosilane |
| Hydrophobic | C12 | D6221 | n-Dodecyltriethoxysilane |
| Hydrophobic | C18 | O9750 | n-Octadecyltrichlorosilane |
| Hydrophobic | C18 | O9775 | n-Octadecyltriethoxysilane |
| Hydrophobic | C18 | O9780 | n-Octadecyltrimethoxysilane |
| Hydrophobic | C18 | PS200 | Glassclad-18 |
| Hydrophobic | C20 | E6240 | n-Eicosyltrichlorosilane |
| Hydrophobic | C22 | D6217 | n-Docosyltrichlorosilane |
| Hydrophobic | Phenyl | P0280 | Phenylytrichlorosilane |
| Hydrophobic | Phenyl | P0320 | Phenyltriethoxysilane |
| Hydrophobic | Tridecafluorooctyl | T2492 | (Tridecafluoro-1,1,2,2,-tetrahydrooctyl)-1-Trichlorosilane |
| Hydrophobic | Tridecafluorooctyl | T2494 | (Tridecafluoro-1,1,2,2,-tetrahydrooctyl)-1-triethoxysilane |
| Reactive | Acryl | A0396 | 3-Acryloxypropyltrichlorosilane |
| Reactive | Acryl | A0397 | 3-Acryloxypropyltrimethoxysilane |
| Reactive | Allyl | A0560 | Allyltrichlorosilane |
| Reactive | Allyl | A0564 | Allyltriethoxysilane |
| Reactive | Allyl | A0567 | Allyltrimethoxysilane |
| Reactive | Bromo | B2615 | 3-Bromopropyltrichlorosilane |
| Reactive | Bromo | B2620 | 3-Bromopropyltrimethoxysilane |
| Reactive | Chlorobutyl | C2980 | 4-chlorobutyldimethylchlorosilane |
| Reactive | (Chloromethyl)phenyl | C3277 | (p-Chloromethyl)phenyltrichlorosilane |
| Reactive | (Chloromethyl)phenyl | C3277.4 | (p-Chloromethyl)phenyltrimethoxysilane |

TABLE 3-continued

| Class | Functionality | Cat# | Chemical Name |
|---|---|---|---|
| Reactive | (Chloromethyl)phenyl | T2902 | 1-Trimethoxysilyl-2-(m,pchloromethyl)phenylethane |
| Reactive | Chloromethyl | C3280 | Chloromethyltrichlorosilane |
| Reactive | Chloromethyl | C3281 | Chloromethyltriethoxysilane |
| Reactive | Chloroethyl | C3150 | 2-Chloroethyltriethoxysilane |
| Reactive | Chloropropyl | C3291 | 3-Chloropropyltrichlorosilane |
| Reactive | Chloropropyl | C3300 | 3-Chloropropyltrimethoxysilane |
| Reactive | Epoxy | G6720 | 3-Glycidoxypropyltrimethoxysilane |
| Reactive | Iodopropyl | I7750 | 3-Iodopropyltrimethoxysilane |
| Reactive | Isocyanato | I7840 | 3-Isocyanatopropyltriethoxysilane |
| Reactive | Mercapto | M8500 | 3-Mercaptopropyltrimethoxysilane |
| Reactive | Mercapto | M8502 | 3-Mercaptopropyltriethoxysilane |
| Reactive | Phosphino | D6110 | 2-(Diphenylphosphino)ethyltriethoxysilane |
| Reactive | Vinyl | V4800 | Vinyltriacetoxysilane |
| Reactive | Vinyl | V4900 | Vinyltrichlorosilane |
| Reactive | Vinyl | V4910 | Vinyltriethoxysilane |
| Reactive | Vinyl | V4917 | Vinyltrimethoxysilane |
| Polar/reactive | Amide | T2507 | N-(Triethoxysilylpropyl)urea |
| Polar/reactive | Amino | A0700 | N-(2-Aminoethyl)-3-aminopropyl trimethoxysilane |
| Polar/reactive | Amino | A0750 | 3-Aminopropyltriethoxysilane |
| Polar/reactive | Amino | A0800 | 3-Aminopropytrimethoxysilane |
| Polar/reactive | Carbomethoxy | C2905 | 2-(Carbomethoxy)ethyltrichlorosilane |
| Polar/reactive | Carboxylic acid | T2913 | N-[(3-Trimethoxysilyl)propyl]ethylenediamine triacetic acid trisodium salt |
| Polar/reactive | Cyano | C3555 | 3-Cyanopropyltrichlorosilane |
| Polar/reactive | Cyano | C3555.3 | 3-Cyanopropyltriethoxysilane |
| Polar/reactive | Chlorosulfonyl | C3355 | 2-(4-Chlorosulfonylphenyl)ethyltrichlorosilane |
| Polar/reactive | Chlorosulfonyl | C3360 | 2-(4-Chlorosulfonylphenyl)ethyltrimethoxysilane |
| Polar/reactive | Pyridyl | T2907 | 2-(Trimethoxysilyl)ethyl-2-pyridine |
| Polar/reactive | Pyrolle | T2923.5 | N-(3-Trimethoxysilylpropyl)pyrolle |
| Polar/reactive | Quaternary Ammonium | O9745 | N-Octadecyldimethyl-[(3-trimethoxysilyl)propyl]ammonium chloride |
| Polar/reactive | Ammonium | S1590 | 3-(N-Styrylmethyl-2-aminoethylamino)-propyl trimethoxysilane hydrochlorid (40% in Methanol) |
| Polar/reactive | Quaternary Ammonium | T2925 | N-Trimethoxysilylpropyl-N,N,Ntrimethylammonium chloride |

For larger scale treatment, organic silane chemical vapor deposition (CVD) can be used for treatment of silicon and its oxide surfaces that yields hydrophobic and superhydrophobic moisture-resistant thin films. CVD of silanes is an effective, solvent-free method for the covalent attachment of these reagents to surfaces. In general, this method can be made more reproducible and robust than silane deposition from solution because it is often difficult to control the degree of hydrolysis and oligomer formation of silanes in solution. In contrast, in the CVD of silanes it is unlikely that hydrolyzed or oligomerized species will reach the substrate because their volatility typically decreases significantly when they hydrolyze or condense with each other. In general, gas phase deposition of silanes is also much cleaner than the liquid phase approach because the surface is not exposed to impurities that may be in the solvent, and no surface rinsing or cleaning is required after adsorption. In addition, if no solvent is required during silane adsorption or in subsequent substrate cleaning, the gas phase approach will generally be more environmentally friendly and industrially viable. Silanes with a variety of terminal functionalities, including amino, vinyl, alkyl, perfluoro, glycidyl, isocyanato, Si—H, and polyethylene glycol, and with different numbers of reactive groups on Si, e.g., —Cl, —OMe, and —OEt, are commercially available, and have been deposited by CVD.

III. Growth of Silicon Nanowires Inside Porous Substrates

There is a need to grow Si nanofibers inside the porous substrates so that Si nanofibers can be constrained in the substrates and catalyst nanoparticle detachment can be avoided during Si nanofiber growth which typically involves rotating motion during growth. In addition, robust porous substrates (e.g., porous Cu, porous Alumina plated by Cu or other metals, porous Silica and other inorganic substrate plated by metal or coated by carbon) can also accommodate Si volume expansion during battery electrode cycling. This approach will facilitate its manufacturing process.

Si nanowires are used as an example in this invention, but any Si particles or thin layers/films are also included. Other Li storage materials are also included.

Graphite and LiCoO2 are normally used and have high coulombic efficiencies (typically >90%) but rather low capacities (372 and 145 mAh/g, respectively). Various anode materials with improved storage capacity and thermal stability have been proposed for lithium-ion batteries in the last decade. Among these, silicon has attracted great interest as a candidate to replace commercial graphite materials owing to its numerous appealing features including:

it has the highest theoretical capacity (Li4.4Si: 4200 mAh/g) of all known materials; and it is abundant, inexpensive, and safer than graphite (it shows a slightly higher voltage plateau than that of graphite, and lithiated silicon is more stable in typical electrolytes than lithiated graphite).

The practical use of Si materials as a negative electrode in lithium-ion batteries was believed to be hindered by the low intrinsic electric conductivity and severe volume changes during Li insertion/extraction processes, leading to poor cycling performance.

By growing Si nanowires on graphite powders or other electric conductive powders or substrates one can dramatically increase Si nanowire conductivity and apply the Si nanowires rooted on the graphite powders. For example, in the battery, electrode slurry and electrode layers can be improved to leverage Si material advantage in high capacity and graphite's high conductivity in a practical way.

However, Si nanowires or nanostructures on the substrate surface may be removed during material handling. For larger scale manufacturing there is a need to control the uniformity of Si nanowire coverage on the substrate surface and its morphology. The inventors have seen that there are lot of curly Si nanofibers formed during their growth. Low cost catalysts (e.g., Cu) are very stable during their nanoparticle synthesis. Its morphology may also change during drying the catalyst deposited substrate powders. The catalyst particles do not have strong adhesion on the substrate surface and not all the catalyst particles showed catalytic activity for Si nanowire growth due to its oxide existing, which indicates that there is a need to grow Si nanofibers inside the porous substrates, and which can mainly restrict the Si nanofibers in the substrates and avoid catalyst nanoparticle from detaching during Si nanofiber growth. In addition, strong porous substrate (e.g., porous Cu, porous Alumina plated by Cu or other metals, porous Silica and other inorganic substrate plated by metal or coated by carbon) can also accommodate Si volume expansion during battery electrode cycling.

The carbon coating or metal plating may make the porous substrate with good electrical conductivity. In particular, Cu plating may act as a catalyst for Si nanofiber growth, for example.

This new approach may eventually minimize carbon utilization and avoid electrolyte sensitivity to multi-active materials in the electrode. The binder dispersion will be much more easily managed in the slurry due to the porous structure of the substrate. It may also provide better thermal properties by minimizing carbon materials and introducing thermally stable porous substrate materials (e.g., Alumina, Cu, and Silica).

Figure 8:
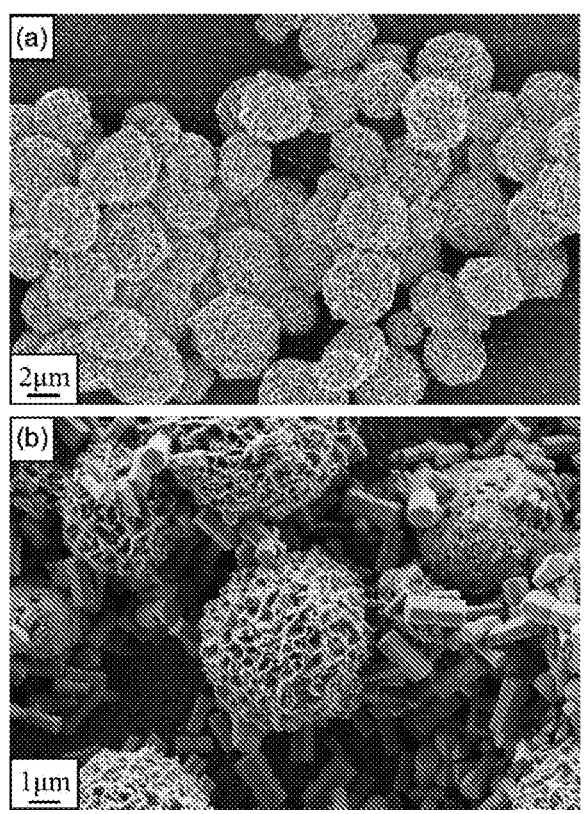
FIG. 8 illustrates scanning electron microscope photographs of porous copper oxide composites, according to embodiments.

A low temperature synthesis approach can be used for making porous copper oxide composites see the images of FIG. 8. This demonstrates that the porous substrates can be made with an ideal morphology to host Si nanofibers and accommodate its volume expansion later in the battery.

IV. Four Electrode Cell with Dual Reference Micro-Cell System.

Various anode materials with improved storage capacity and thermal stability have been proposed for lithium-ion batteries in the last decade. Among these, silicon (Si) has attracted great interest as a candidate to replace commercial graphite materials owing to its numerous appealing features: it has the highest theoretical capacity (Li4.4Si: 4200 mAh/g) of all known materials, and is abundant, inexpensive, and safer than graphite (e.g., it shows a slightly higher voltage plateau than that of graphite, and lithiated silicon is more stable in typical electrolytes than lithiated graphite).

In an embodiment, a dual-reference electrode micro-cell system can use well-cyclable graphite, carbon, lithium titanium oxide (LTO), lithium iron phosphate (LFP), LCO, NCA, NCM, LMO or Li or any battery anode and cathode materials as the reference electrode materials to make micro-anode or cathode electrodes for the micro-cell's dual reference electrodes. The electrodes can be made using any of the conventional battery electrode processing techniques and micro-fabrication techniques and processes.

Figure 9:
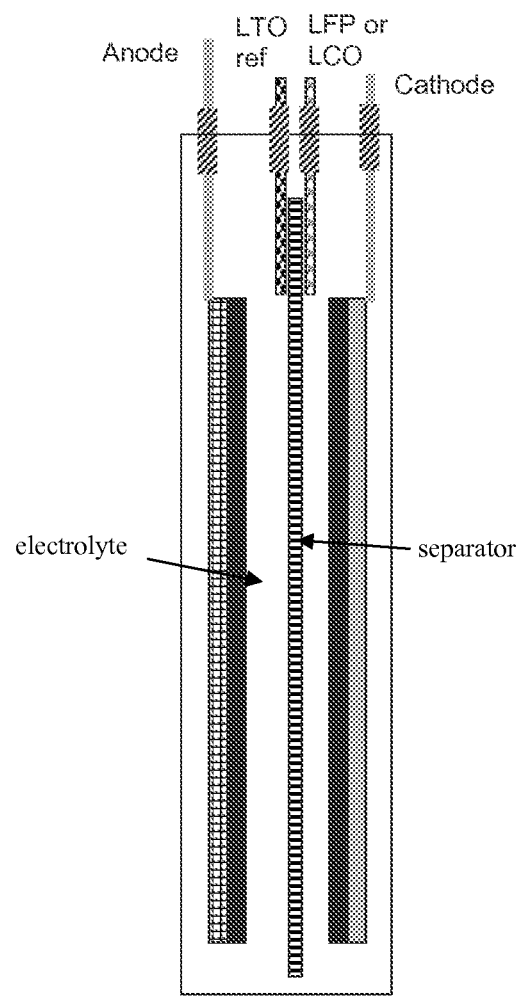
FIG. 9 illustrates a four electrode battery system, according to an embodiment.

In an embodiment, one can introduce a dual reference micro cell system in batteries, e.g. lithium ion cells. The battery becomes a four electrode battery system, as shown in FIG. 9.

Figure 10A:
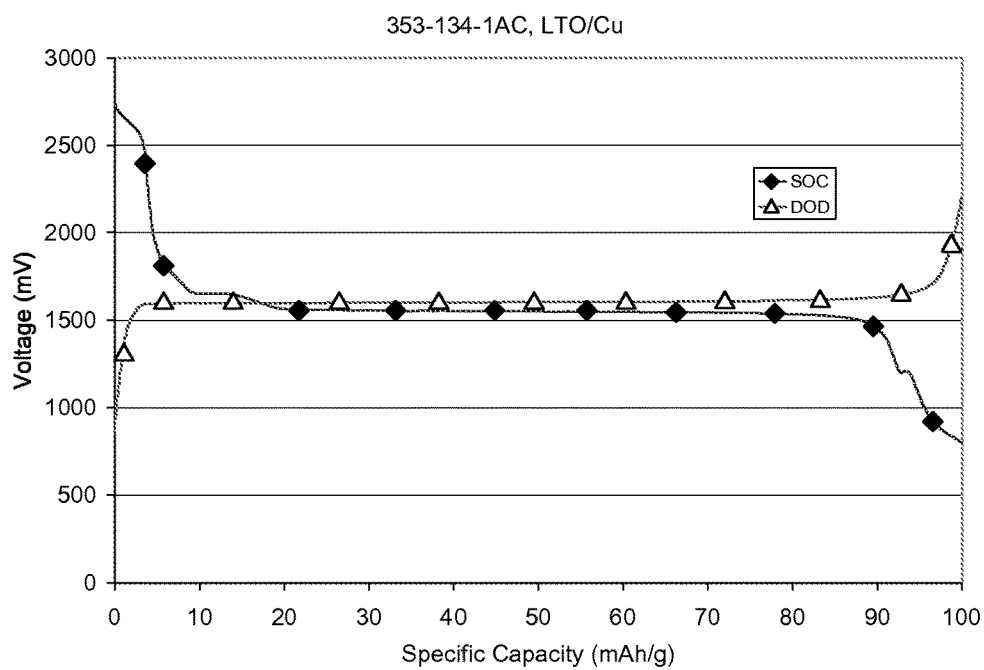
FIGS. 10A and 10B illustrate state of charge and depth of discharge for different battery arrangements, according to embodiments.
Figure 10B:
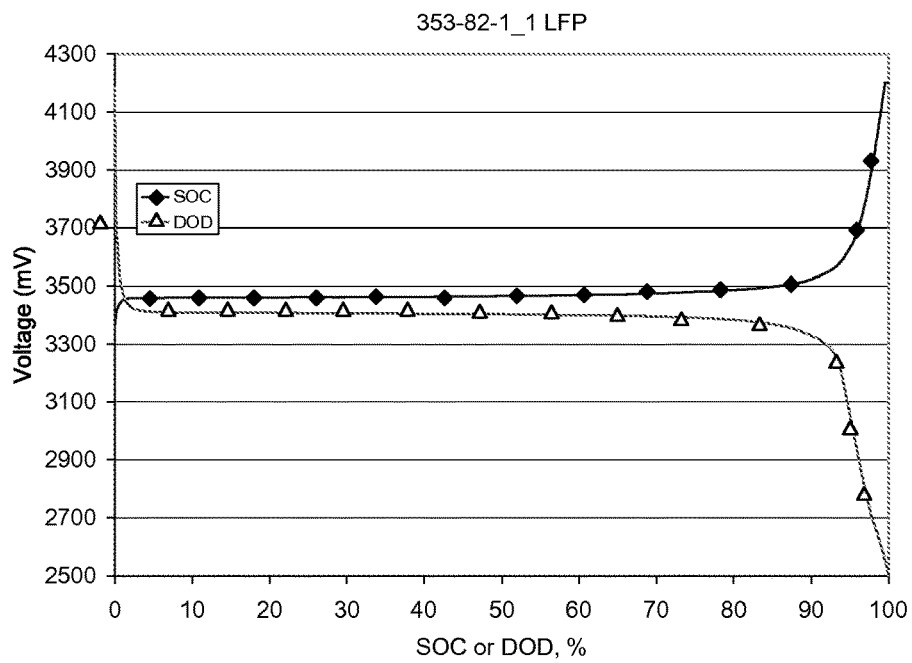

LTO/LFP micro cell can be charged and discharged to control its state of charge (SOC) and depth of discharge (DOD) so that a flat voltage plateau can be achieved and maintained, as seen in FIGS. 10A and 10B.

LTO plateau potential can be very stable at 1.585+/−3 mV in a range of 30~60% SOC. LFP plateau potential is also very stable at 3.435+/−3 mV in a range of 35~60% SOC. This allows one to control the LTO and LFP potentials by periodically charging or discharging 0.1~1% or 0.1~10%. Because LTO and LFP can be very quickly charged or discharged the reference electrodes' self-sustaining process can be as fast as few milliseconds to a few seconds.

Figure 11:
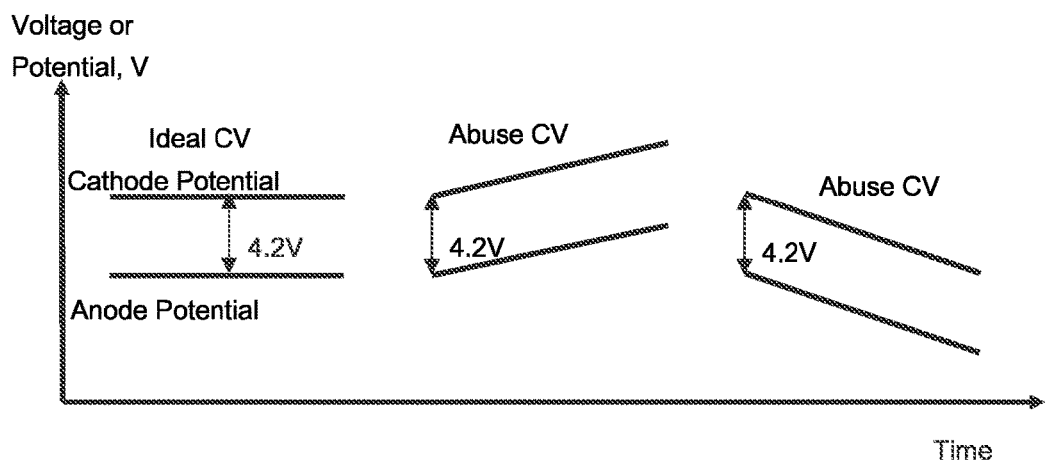
FIG. 11 illustrates parallel increase in voltage of the anode and cathode in a four electrode cell, according to an embodiment.

Dual reference electrodes can be used to control the anode and cathode separately or to double check the anode or/and cathode status, such as the ideal constant voltage (CV) control shown in FIG. 11. A conventional voltage control cannot find anode or cathode electrode problems or risks illustrated as "abuse CV" in FIG. 11.

The features of a dual reference electrode system include:
It can mitigate the risk of Li dendrite formation caused by using metallic Li reference electrodes and hence it can mitigate cell shorting issues that result from using the reference electrodes.
Micro-reference electrodes can be designed in a printing or coating way so that the reference electrodes can be made together with its isolation and shape-forming guide, which facilitates the consequent cell fabrication.
Micro-reference electrodes can be made onto a ultrathin Cu, Ni or Al wire that has spotted coating of LTO, LFP, LMO, LCO, NCA, NCM, Li, Li alloy et al so that the intermittently exposed reference material spots along the wire would lead to uniform potential or voltage monitoring around the electrode area.
The dual reference system can be used to do diagnosis for battery health, especially on individual electrode potential distribution.
It can avoid issues using cell voltage as sensing because the voltage can be constant even though both anode and cathode potentials have decreased or increased in parallel as illustrated in FIG. 11. Potential control is much better than voltage control. It is important to keep both anode and cathode potentials under control or monitoring so that the cell voltage will be a natural potential difference of anode and cathode, which is in the safe range that can be stably cycled for charge and discharge.
Dual reference introduction in battery product allows the use of smart charging and discharging protocols to manage the battery cell and system. Today's BMS's current-voltage (I-V) characteristics can be fully programmable. A practical charging or discharging protocol can be designed on the basis of the anode potential profile and the cathode potential profile for all chemistries.

When the battery voltage reaches about 4.1 V (e.g.), the typical charger switches to a constant voltage phase to avoid the risk of overcharging and manages the transition from constant current to constant voltage smoothly to ensure maximum capacity is reached without risking damage to the battery. However, the cell voltage control does not reflect the anode and cathode potentials that are controlled individually, in particular, Si composite anode and composite cathode have multi-phases involved during charge and discharge. It becomes critical to set up a control of the anode potential or cathode potential during full cell charging or discharging so that the cycle life can be prolonged.

V. Example Cell Preconditioning Processes

Figure 12:
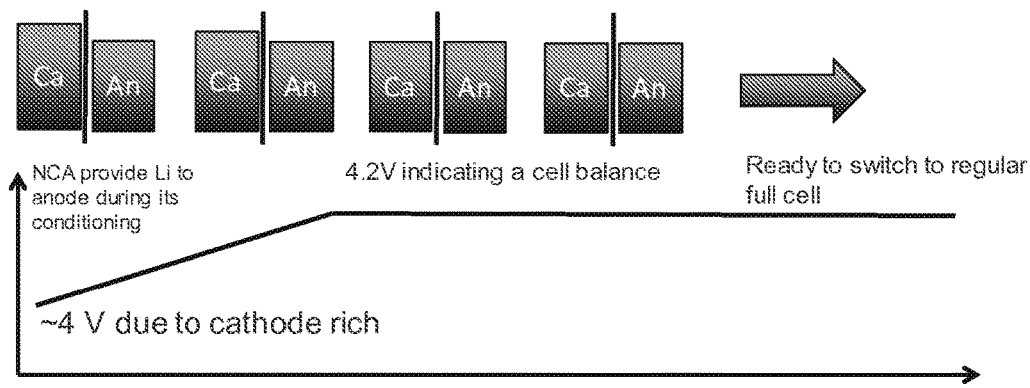
FIG. 12 illustrates a cell preconditioning process, according to an embodiment.
Figure 13:
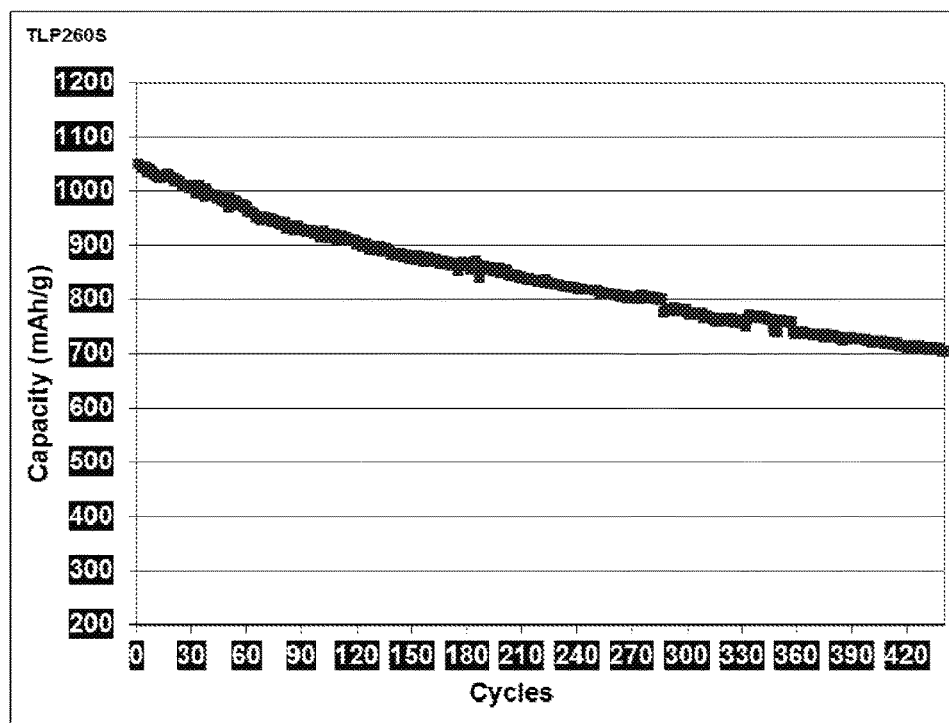
FIG. 13 illustrates improved cycling results, according to an embodiment.

In an embodiment, a cell can be preconditioned in a half cell mode by first controlling anode vs. reference electrode potential, then switching the cell to an anode vs. cathode regular full cell. FIG. 12 illustrates balancing the electrode potential of the anode before switching over to using a full cell. Although the cell starts out cathode-rich, the initial cycling is controlled by the anode potential. The full cell may be either the pouch cell shown in FIG. 3 or the four-electrode configuration shown in FIG. 9. FIG. 13 illustrates the improved cycling of the conditioned cell. The improved cell has a specific capacity of >1050 mAh/g with only 7% decay in the first 50 cycles for the full cell. It has a capacity retention of 80% at its $210^{th}$ cycle and 70% at its $360^{th}$ cycle. The pouch cell exhibits a slower decay of 4% in 30 cycles, which is much lower than the 10.5% decay exhibited in non-preconditioned cells.

In another embodiment, a cell can be preconditioned using an anode and a cathode with excess capacity in the absence of a reference electrode. The cell is conditioned, or activated, by using constant current for a certain time that is estimated by the anode capacity. Eventually, the cell reaches a balanced cathode/anode capacity ratio. At this point, the cell can be cycled using typical constant current-constant voltage (CCCV) for charging and constant current (CC) for discharging. This process is shown schematically in FIG. 14.

For example, a lithium ion cell is designed at a cathode capacity/anode capacity ratio=1.2 (C/A=1.2), which is a cathode-rich cell design to accommodate the more NCA cathode loss in the 1st cycle due to NCA's low initial coulombic efficiency of 89% while anode has an initial coulomic efficiency of 91%. To avoid lithium plating on the anode the anode capacity is controlled from the 1st charging at a lower constant current: CC for a fixed time (no constant voltage step: CV). Over the initial several cycles the cell voltage increases from about 4V (up to the C/A ratio in the designed cell) to 4.2 V indicating the C/A ratio reaches a balanced state of about 1. Then a regular cell charge/discharge protocol can be applied, i.e. CC-CV charge/CC discharge.

Figure 14:
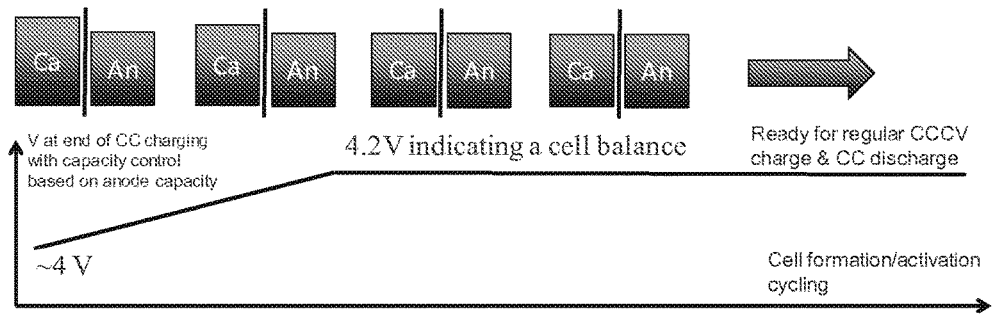
FIG. 14 illustrates a cell preconditioning process, according to an embodiment.
Figure 15:
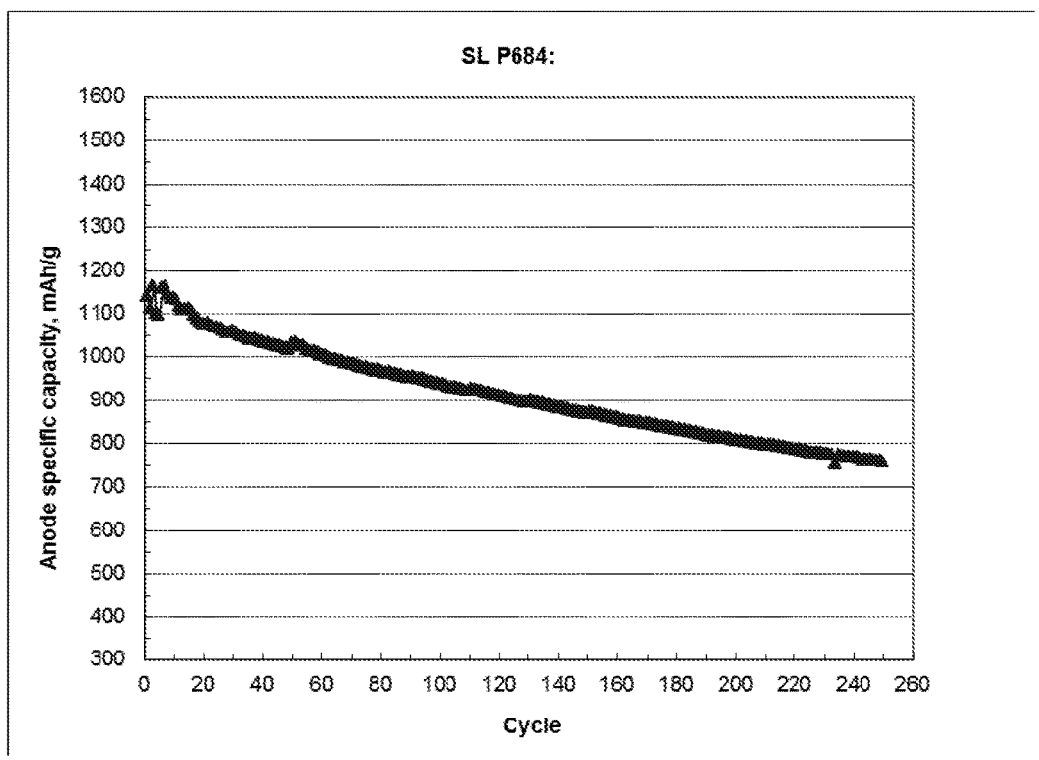
FIG. 15 illustrates improved cycling results, according to an embodiment.

FIG. 15 illustrates the improved cycling results of a preconditioned cell using the process described in FIG. 14. The controlled capacity activation enables the cathode-rich cell design for high energy density cells. An optimal C/A ratio and activation process may further improve the cycling performance of the high energy density cell.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

What is claimed is:

1. A method for conditioning an anode electrode in an electrochemical cell, the method comprising:
   providing an electrochemical cell comprising a silicon-comprising anode electrode, a cathode electrode, an electrolyte, and at least one micro-reference electrode, wherein the cathode electrode over anode electrode capacity ratio is between 1 and 1.3;
   conditioning the anode electrode in the electrochemical cell in a half cell mode by passing a current between the anode electrode and the cathode electrode while controlling the potential between the anode electrode and the at least one micro-reference electrode to avoid Li plating until the anode electrode reaches a stabilized state; and
   switching the electrochemical cell to a regular full cell mode and applying a CC-CV charging/CC discharging protocol.

2. The method of claim 1, wherein the at least one micro-reference electrode is connected to an electronic circuit controlling the potential between the anode electrode and the at least one micro-reference electrode and the potential between the cathode electrode and at least one micro-reference electrode.

3. The method of claim 2, wherein the conditioning further comprises controlling the potential between the anode electrode and the at least one micro-reference electrode within the range from about 0.01 to 700 mV during the half cell mode.

4. The method of claim 1 further comprising, after switching to full cell mode, monitoring during cycling the potential between the anode electrode and the at least one micro-reference electrode and the potential of the cathode electrode and the at least one micro-reference electrode via a Battery Management System (BMS) to avoid Li-plating of the anode and to avoid over charging of the cathode.

5. The method of claim 1 further comprising, after switching to full cell mode, applying the charging/discharging protocol via a programmable Battery Management System (BMS), wherein the protocol is based on the anode and the cathode potential profiles based on the electrodes chemistries.

6. The method of claim 1, wherein the silicon in the silicon comprising anode electrode is in the form of Si nanowires directly grown on or deposited on graphite powders.

7. The method of claim 1, wherein the silicon in the silicon comprising anode electrode is in the form of Si nanopowders directly grown or deposited on graphite powders.

8. The method of claim 1, wherein the silicon in the silicon comprising anode electrode is in the form of Si thin films directly grown or deposited on graphite powders.

9. The method of claim 1, wherein the at least one micro-reference electrode is placed aside to or in a slot within the anode electrode.

10. The method of claim 1, wherein the at least one micro-reference electrode comprises lithium metal or a lithium-containing metal oxide in contact with the electrolyte.

11. The method of claim 10, wherein the at least one micro-reference electrode comprises lithium deposited in situ in the full electrochemical cell or during the cell fabrication.

12. The method of claim 11, wherein the at least one micro-reference electrode comprises lithium re-deposited in situ in the full electrochemical cell after a period of normal full cell mode cycling to avoid or remedy degradation of the micro-reference electrode.

13. The method of claim 1, wherein the at least one micro-reference electrode comprises any of: LTO, LFP, LCO, NCA, NCM, LMO or Li.

* * * * *